US011872803B2

(12) United States Patent
Beaty

(10) Patent No.: US 11,872,803 B2
(45) Date of Patent: Jan. 16, 2024

(54) APPARATUS, METHOD, AND SYSTEM FOR ALIGNING, STACKING, AND APPLYING CRAFT VINYL

(71) Applicant: Margaret Beaty, New Braunfels, TX (US)

(72) Inventor: Margaret Beaty, New Braunfels, TX (US)

( * ) Notice: Subject to any disclaimer, the term of this patent is extended or adjusted under 35 U.S.C. 154(b) by 332 days.

(21) Appl. No.: 17/494,675

(22) Filed: Oct. 5, 2021

(65) Prior Publication Data

US 2022/0118755 A1 Apr. 21, 2022

Related U.S. Application Data

(60) Provisional application No. 63/094,155, filed on Oct. 20, 2020.

(51) Int. Cl.

| | |
|---|---|
| ***B41F 16/02*** | (2006.01) |
| ***B41M 5/03*** | (2006.01) |
| ***D06P 5/20*** | (2006.01) |
| ***D06P 5/24*** | (2006.01) |

(52) U.S. Cl.

CPC ............... *B41F 16/02* (2013.01); *B41M 5/03* (2013.01); *D06P 5/003* (2013.01); *D06P 5/2066* (2013.01)

(58) Field of Classification Search

CPC ........... B41F 16/02; B41F 16/00; B41M 5/03; B41M 5/025; D06P 5/003; D06P 5/20; D06P 5/2066; D05B 97/12; D05B 91/05; D05B 39/00; D05C 1/00

See application file for complete search history.

(56) References Cited

U.S. PATENT DOCUMENTS

| | | | | |
|---|---|---|---|---|
| 1,411,908 A * | 4/1922 | Cacici | D05C 1/02 | 123/41.14 |
| 3,553,062 A * | 1/1971 | Berlin | B44C 3/025 | 428/195.1 |
| 4,078,463 A * | 3/1978 | Leonard | B26D 7/025 | 83/939 |
| 5,386,654 A * | 2/1995 | Kroenke | B26D 7/20 | 223/69 |
| 10,766,289 B2 * | 9/2020 | Kobayashi | B41J 3/4078 | |

(Continued)

FOREIGN PATENT DOCUMENTS

| | | | | |
|---|---|---|---|---|
| CN | 111789388 A * | 10/2020 | | |
| JP | 2010082017 A * | 4/2010 | | |
| WO | WO-0049216 A1 * | 8/2000 | | B41F 16/02 |

*Primary Examiner* — Ismael Izaguirre

(74) *Attorney, Agent, or Firm* — PERKINS COIE LLP; Michael A. Glenn

(57) ABSTRACT

Methods, systems, and apparatus for aligning, stacking, and applying craft vinyl are disclosed. A fabric is secured by multiple clamps to a first surface and a second surface of a box when the box is in an open configuration. The first surface has a first measurement grid affixed thereupon. The second surface has a second measurement grid affixed thereupon. The fabric is aligned to the first measurement grid and the second measurement grid. Each vinyl layer of multiple vinyl layers defining a pattern is aligned to each other vinyl layer of the multiple vinyl layers by one or more pegs located on an edge of the first surface of the box. The multiple vinyl layers are positioned on the fabric by the one or more pegs. The multiple vinyl layers are pressed onto the fabric to print the pattern onto the fabric.

20 Claims, 10 Drawing Sheets

(56) References Cited

U.S. PATENT DOCUMENTS

| | | | | |
|---|---|---|---|---|
| 2002/0131062 | A1* | 9/2002 | Neri | B44C 1/1712<br>358/1.9 |
| 2008/0022542 | A1* | 1/2008 | Brosmith | B26B 29/06<br>33/562 |
| 2008/0241306 | A1* | 10/2008 | Goss | B41F 16/02<br>425/385 |
| 2015/0267334 | A1* | 9/2015 | Works | D05B 97/12<br>33/566 |
| 2019/0338450 | A1* | 11/2019 | Kawaguchi | D05C 9/04 |

* cited by examiner

APPARATUS, METHOD, AND SYSTEM FOR ALIGNING, STACKING, AND APPLYING CRAFT VINYL

CROSS-REFERENCE TO RELATED APPLICATION(S)

This application claims the benefit of U.S. Provisional Patent Application No. 63/094,155, filed Oct. 20, 2020, which is incorporated by reference in its entirety herein.

TECHNICAL FIELD

The present invention relates generally to an apparatus, method, and system. More specifically, the present invention is an apparatus, method, and system for aligning, stacking, and applying craft vinyl.

BACKGROUND

Vinyl cutting is sometimes used to create decals, apparel, stencils, graphics, and more. A vinyl cutter is a type of computer-controlled machine for cutting vinyl. A design for a decal or apparel can be created using editing software on a computer device. The design is sent to a vinyl cutter that cuts out the parts of the design using a blade on sheets of vinyl. A design having multiple shapes, colors, and/or layers typically has each element of the design cut separately and layered back to replicate the complete design.

Craft vinyl projects sometimes involve two or more parts of a design and/or two or more colors that are cut out on multiple vinyl layers on a vinyl cutting machine. The parts of the vinyl layers are then combined (layered) to create a composite design. The process of vinyl layering, using both adhesive and heat transfer vinyl, is typically performed by hand by a human using visual alignment by the human eye. With heat transfer vinyl, each vinyl layer is individually pressed to a receiving fabric such that the design becomes permanent. The intended receiving item for the design is precisely measured and monitored such that the design is level and in the desired location. However, misalignment of vinyl by human hands and the human eye and/or incorrect measurements often results in loss of vinyl and the receiving item, thus costing time, money, and waste of material.

SUMMARY

Methods, apparatus, and systems for aligning, stacking, and applying craft vinyl are disclosed. In some embodiments, a fabric is secured by multiple clamps to a first surface and a second surface of a box when the box is in an open configuration. The first surface has a first measurement grid affixed thereupon. The second surface has a second measurement grid affixed thereupon. The fabric is aligned to the first measurement grid and the second measurement grid. Each vinyl layer of multiple vinyl layers defining a pattern is aligned to each other vinyl layer of the multiple vinyl layers by one or more pegs located on an edge of the first surface of the box. The multiple vinyl layers are positioned on the fabric by the one or more pegs. The multiple vinyl layers are pressed onto the fabric to print the pattern onto the fabric.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. All illustrations of the drawings are for the purpose of describing selected versions of the present invention and are not intended to limit the scope of the present invention.

This document presents methods, systems, and apparatus for aligning, stacking, and applying craft vinyl. In particular, the embodiments disclosed herein provide an apparatus and methods to facilitate the alignment, assembly, and placement of vinyl designs. In some embodiments, a mechanical system is provided to assemble vinyl components to form a pattern or decoration. In some embodiments, a fabric is secured by multiple clamps to a first surface and a second surface of a box when the box is in an open configuration. The first surface has a first measurement grid affixed thereupon. The second surface has a second measurement grid affixed thereupon. The fabric is aligned to the first measurement grid and the second measurement grid. Each vinyl layer of multiple vinyl layers defining a pattern is aligned to each other vinyl layer of the multiple vinyl layers by one or more pegs located on an edge of the first surface of the box. The multiple vinyl layers are positioned on the fabric by the one or more pegs. The multiple vinyl layers are pressed onto the fabric to print the pattern onto the fabric.

The advantages and benefits of the methods, systems, and apparatus for aligning, stacking, and applying craft vinyl disclosed herein include obviating the traditional and unreliable manual and sight processes used. Using the embodiments disclosed herein, heat transfer vinyl can be centered, aligned, and pressed to fabric items. The system disclosed saves time and is easy to use. Loss of material and fabric items from misalignment or placement mistakes is reduced. The system disclosed further provides storage space for accessories, a work surface, and portability.

Figure 1:
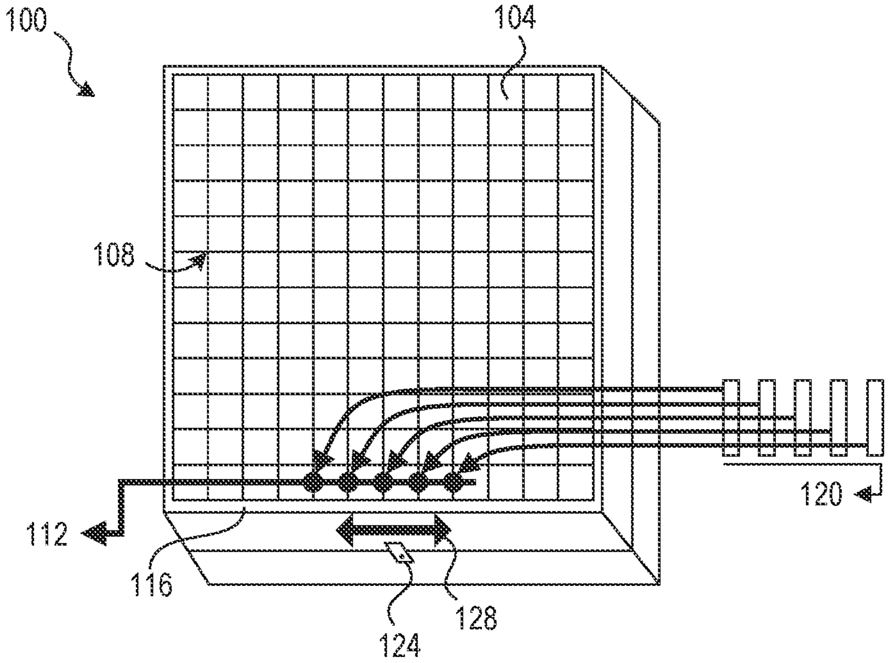
FIG. 1 is a perspective view of an apparatus for aligning, stacking, and applying craft vinyl, in accordance with one or more embodiments.

FIG. 1 is a perspective view of an apparatus for aligning, stacking, and applying craft vinyl, in accordance with one or more embodiments. In some embodiments, the apparatus includes a rectangular box 100 having a first surface 104 and a second surface 204 (see FIG. 2). The first surface 104 has a first measurement grid 108 affixed thereupon and the second surface 204 has a second measurement grid 208 affixed thereupon. The first surface 104 is opposite the second surface 204 when the box 100 is in a closed configuration. The first 104 and second surfaces 204 are aligned in a plane when the box 100 is in an open configuration (see FIG. 4). Likewise, embodiments of the apparatus can include different and/or additional components or can be connected in different ways.

Figure 2:
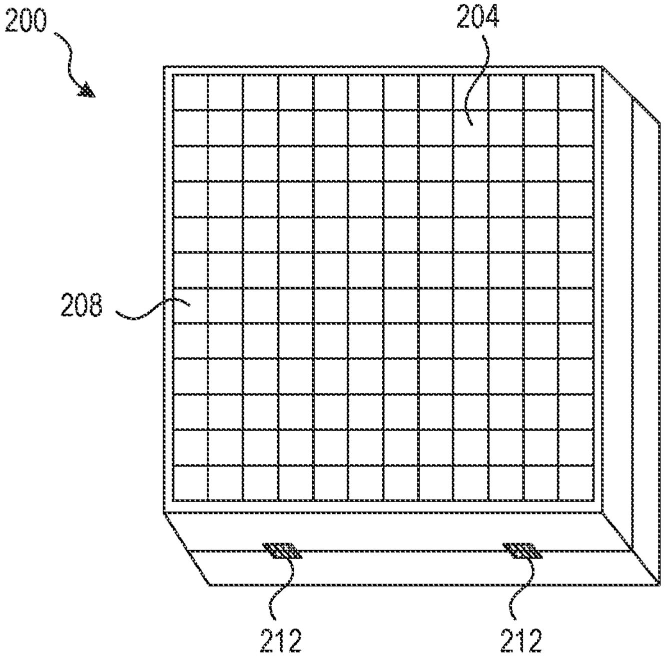
FIG. 2 is a perspective view of an apparatus for aligning, stacking, and applying craft vinyl, in accordance with one or more embodiments.

Referring to FIG. 1, the apparatus includes the two-sided box 100 whose sides 104, 204 can be joined by hinges 212 at the back (see FIG. 2). Box 100 is a hollow box. A clasp 124 and a handle 125 on a surface of the box 100 can be used to shut or lock the box and hold it shut, as well as to carry the box to a different location. The apertures at the edge 116 can be at an equal distance from each other sized to accommodate the fixation points 112. Both the first 104 and second 204 sides have measurement grids 108, 208.

In some embodiments, a fabric 804 (see FIG. 8) is aligned to the first measurement grid 108 and the second measurement grid 208. Each layer of a pattern 708 (see FIG. 7) is further aligned to each other layer of the pattern by one or more fixation points 112 located on an edge 116 of the first surface 104 of the box 100. For example, the one or more fixation points 112 can include pegs 120 placed in holes on the first surface 104 of the box 100. The fixation points 112 can include pins, screws, tacks, or pegs 120. In some embodiments, the layers are aligned via multiple apertures (e.g., holes, openings, etc.) formed in the box 100 that correspond to the one or more fixation points 112. The one or more affixation points 112 are configured to position the vinyl layers on the fabric 804 for printing the pattern onto the fabric 804. The layers (e.g., vinyl) of the pattern are positioned on the fabric 804 by the one or more fixation points 112. The layers are pressed onto the fabric 804 to transfer the pattern onto the fabric 804.

The box 100 provides systems and methods to facilitate the alignment, assembly, and placement of vinyl designs. The embodiments disclosed provide a mechanical system to assemble vinyl components to form a pattern or decoration. The systems disclosed further provide a space for accessories, a work surface (surfaces 104, 204) and portability.

FIG. 2 is a perspective view of an apparatus for aligning, stacking, and applying craft vinyl, in accordance with one or more embodiments. The apparatus includes a box 200 that has a first surface 104 having a first measurement grid 108 (see FIG. 1) affixed thereupon. The box 200 has a second surface 204 having a second measurement grid 208 affixed thereupon. The first surface 104 is positioned opposite the second surface 204 when the box 200 is in a closed configuration. The two-sided box 200 has sides 104, 204 that can be joined by hinges 212 at the back, such that the box 200 can be changed from the open configuration (e.g., for printing the pattern 708 of FIG. 7 on a fabric) to the closed configuration (for carrying the box 200). Likewise, embodiments of the apparatus can include different and/or additional components or can be connected in different ways.

Figure 3:
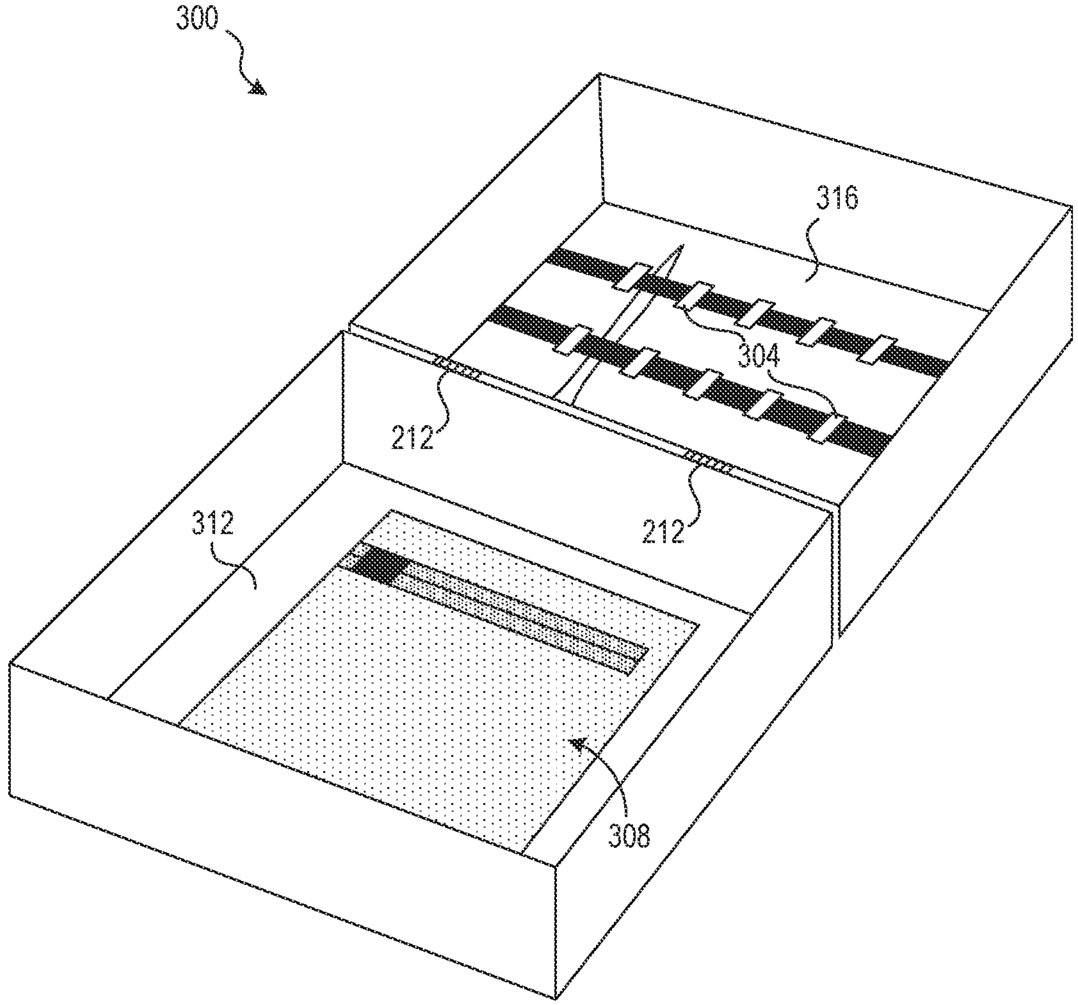
FIG. 3 is a perspective view of an apparatus for aligning, stacking, and applying craft vinyl, in accordance with one or more embodiments.

FIG. 3 is a perspective view of an apparatus for aligning, stacking, and applying craft vinyl, in accordance with one or more embodiments. The apparatus includes a two-sided box 300 shown in an open configuration. The first 104 and second surfaces 204 (see FIGS. 1, 2) are aligned in a plane when the box 300 is in the open configuration. Likewise, embodiments of the apparatus can include different and/or additional components or can be connected in different ways.

In some embodiments, a removable utility bag 308 is mounted on an inner surface 312 of the box 300. In some embodiments, a set of tool holders 304 are mounted on an inner surface 316 of the box 300. For example, the inside of the box 300 can be used to contain or store the tool holders 304 on one side and a secured, removable utility bag 308 on the other side. Vinyl cutting machines sometimes are used to cut materials other than vinyl. Some users use a cutter to create greeting cards, invitations, paper flowers, or other paper projects. Some of the materials that can be cut are paper, fabric, leather, cardboard, cardstock, some woods, felt, leather, and more. The box 300 thus provides portable tool storage 300, a work surface, and measurement grids. The two-sided box 300 has sides 104, 204 that can be joined by hinges 212 at an edge, such that the box 300 can be changed from the open configuration (for printing a pattern on a fabric) to the closed configuration (for carrying the box 300).

Figure 4:
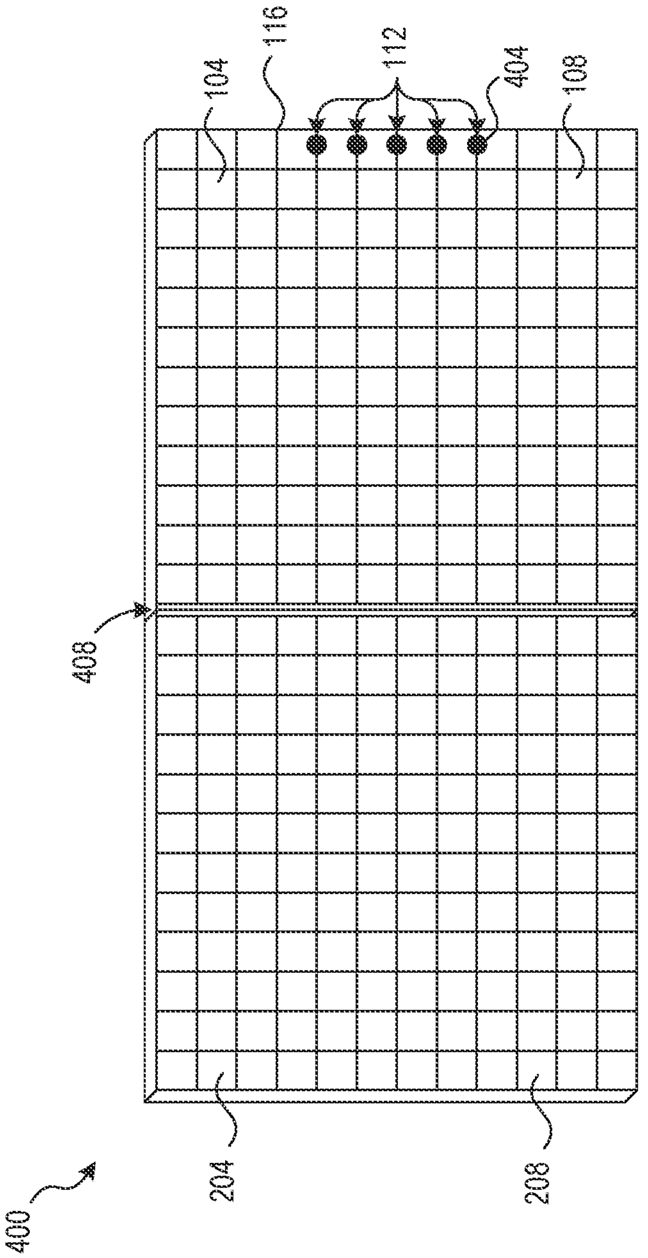
FIG. 4 is a planar view of an apparatus for aligning, stacking, and applying craft vinyl, in accordance with one or more embodiments.

FIG. 4 is a planar view of an apparatus for aligning, stacking, and applying craft vinyl, in accordance with one or more embodiments. The apparatus includes a two-sided, rectangular box 400 having a first surface 104 and a second surface 204. The first surface 104 has a first measurement grid 108 affixed thereupon. The second surface 204 has a second measurement grid 208 affixed thereupon. The first surface 104 is opposite the second surface 108 when the box 400 is in a closed configuration (see FIG. 1). The first and second surfaces 104, 108 are aligned in a plane when the box 400 is in an open configuration. Likewise, embodiments of the apparatus can include different and/or additional components or can be connected in different ways.

A pattern 708 (see FIG. 7) for printing on a fabric is provided that includes multiple layers (e.g., vinyl) defining the pattern. Each layer is aligned to each other layer of the multiple layers by one or more fixation points 112 located on an edge 116 of the first surface 104 of the box 400. The multiple layers of vinyl are positioned on the fabric by the one or more fixation points 112 for pressing the layers onto the fabric to transfer the pattern onto the fabric. The multiple layers are aligned via multiple apertures 404 formed therethrough that correspond to the one or more fixation points 112. Each vinyl layer is positioned onto the box 400, such that the one or more fixation points 112 fit through the apertures 404. In some embodiments, the fixation points 112 include at least one of pins, screws, tacks, or pegs 120 (see FIG. 1). The fixation points 112 further align the layers on the fabric secured to the box 400. The one or more affixation points 112 are further configured to position the vinyl layers on the fabric for printing the pattern onto the fabric.

The box 400 is opened and placed with the first measurement grid 108 and the second measurement grid 208 in a plane. The fabric can be positioned or centered on the first surface 104 and second surface 204 by alignment to the first measurement grid 108 and the second measurement grid 208. Using the separation or space 408 between the first surface 104 and second surface 204, a heat erasable pen 812 (see FIG. 8) can be used to run a vertical line down the fabric. For example, a desired location for a bottom edge of the pattern placement is determined. A spacing allowance can be allocated for space between the apertures 404 and the pattern.

Figure 5:
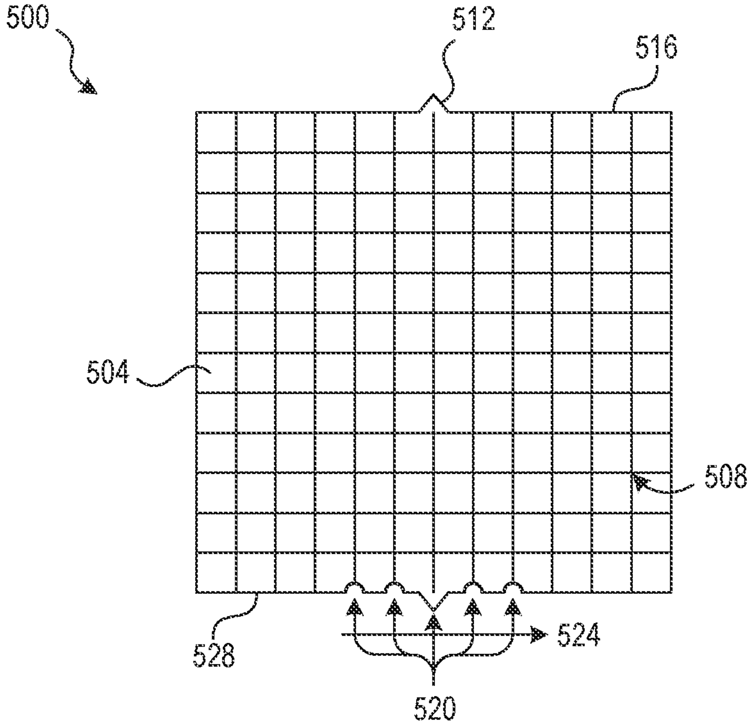
FIG. 5 is a planar view of a fabric alignment board for aligning, stacking, and applying craft vinyl, in accordance with one or more embodiments.

FIG. 5 is a planar view of a fabric alignment board 500 for aligning, stacking, and applying craft vinyl, in accordance with one or more embodiments. In some embodiments, the apparatus of FIG. 4 further includes a fabric alignment board 500 attached to the box 400 and configured to position or center a pattern 708 (see FIG. 7) on fabric. The pattern can be centered on the fabric using the fabric alignment board 500. The fabric alignment board 500 is a thin, heatproof board. A surface 504 of the fabric alignment board 500 has a measurement grid 508 similar to the measurement grids 108, 208 (see FIGS. 1, 2). In some embodiments, the fabric alignment board 500 has a V-shaped alignment guide notch 512 at a top edge 516. The fabric alignment board 500 has another V-shaped alignment guide notch 520 at a bottom edge 528. Likewise, embodiments of the fabric alignment board 500 can include different and/or additional components or can be connected in different ways.

The fabric alignment board 500 has scores or cuts 524 (e.g., half-circle scores) at the bottom edge 528. The scores 524 are sized to fit around the one or more fixation points 112 (see FIG. 1) and, in some embodiments, are sized to include a space allowance for the fabric being printed. The scores 524 are placed the same distance apart as the apertures 404 on the box 400 (see FIG. 4). The box 400 is in an open configuration. The fabric alignment board 500 that has the notch 512 and the half-circle scores 524 is placed on one side of the fabric (e.g., a garment). The fabric is folded under the fabric alignment board 500. A vertical inked line is centered using the groove or space 408 aligned to the V-shaped alignment guide notches 512, 520. Thus, both horizontal and vertical alignment are achieved for a center of the fabric. The scores 524 of the fabric alignment board 500 are pushed against the pegs 120, such that they fit against the pegs 120 at the fixation points 112. The fabric is then folded under the box 400 on the sides of the box 400, such that the fabric is held tautly. Thus, to allow for the normal stretch of the fabric 804 when it is being worn or used, the embodiments keep the fabric 804 taut during the heat adherence process to allow for normal stretching of the fabric 804 without splitting and/or cracking the design.

In some embodiments, the fabric is secured by fasteners to the box 400 when the box 400 is in the open configuration. In some embodiments, securing the fabric includes folding the fabric around the box 400 and positioning the fasteners on one or more sides of the box 400. For example, clamps can be placed on the top edge 516 of the fabric alignment board 500 and around the box 400 to secure the fabric to the box 400 and prevent movement of the fabric. The pattern can be positioned or centered by the fabric alignment board 500 by marking the pattern with a centered line using a heat erasable pen. In some embodiments, the fabric alignment board 500 is configured to center the pattern by aligning a center vertical line and a center horizontal line marked on the pattern with the notches 512, 520 on the edges 516, 528 of the fabric alignment board 500.

Figure 6:
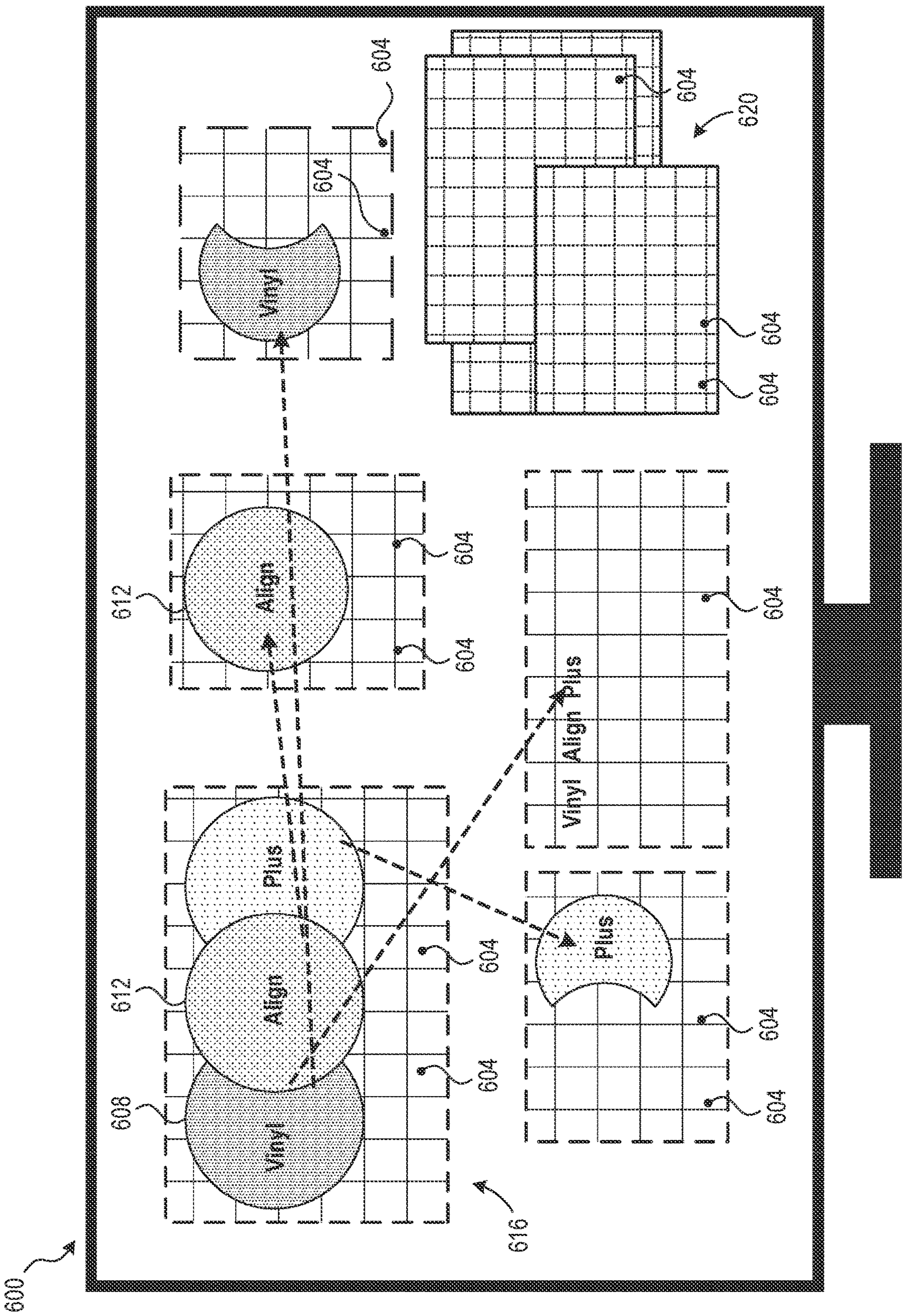
FIG. 6 is a diagram illustrating a method for aligning, stacking, and applying craft vinyl, in accordance with one or more embodiments.

FIG. 6 is a diagram illustrating a method for aligning, stacking, and applying craft vinyl, in accordance with one or more embodiments. The method can be performed using software (e.g., cutter's software) on a computer 600. In other embodiments, the process of FIG. 6 is performed by a computer system. Likewise, embodiments can include different and/or additional steps, or perform the steps in different orders. Using the method, alignment marks, dots, or circles 604 are added to a bottom, a top, or sides of a pattern 708 (see FIG. 7) to be printed on a fabric. In some embodiments, the pattern includes multiple layers defining the pattern. For example, the pattern includes the layers 608, 612. In some embodiments, the multiple layers are made of vinyl. The alignment circles 604 are positioned or centered to the middle of the image 616 of the pattern. For a pattern having multiple color layers and shapes 608, 612, the elements of the pattern are isolated and/or replicated 602 along with their alignment circles 604. Each element (e.g., layer 612) is isolated using the software on the computer 600 and separated from the image 616 as a separate standalone image. The circles 604 are larger than the fixation points 112, such that the pegs 120 can be inserted easily but fit tightly to eliminate movement of the vinyl. The circles 604 are spaced the match the holes 404 (see FIG. 4) on the box 400. The number of holes used, and their position, is optional depending on the size of the pattern 708.

A rectangle or square of transfer tape 620 of the same size (or a little larger) as the image 616 is created. Holes or apertures are cut into the transfer tape 620 to match the circles 604. In some embodiments, the box 400 includes a tool configured to form the alignment apertures through the one or more layers (see FIG. 3). Each layer (e.g., layer 608) will be aligned to each other layer (e.g., layer 612) by one or more fixation points 112 corresponding to the holes (corresponding to the circles 604). The layers are positioned on the fabric by the one or more fixation points 112 (see FIG. 1). A rectangle of transfer tape 620 is cut for each separated component (e.g., layer 608), except for a back layer (sometimes referred to as a backing). The pattern is cut in the vinyl layers, leaving the backing uncut, except for the holes (corresponding to the circles 604) that have been cut through the vinyl and the backing. In some embodiments, waste vinyl is trimmed off the vinyl layers for aligning each layer. For example, once the vinyl cutter has been used to cut the pattern, all waste vinyl is removed (sometimes referred to as weeded) from the paper-backed sheet. This leaves only the desired shapes (e.g., layer 612) that remain attached to the backing. The weeding can be performed on the top of the box 400. In some embodiments, the "positive parts" of the design (e.g., layer 612) are themselves removed, such that a "negative" decal would result from printing on fabric. Such a decal can be used as a stencil. In other embodiments, the "negative parts" are removed, providing a positive decal.

In some embodiments, the multiple vinyl layers are aligned via holes or apertures (corresponding to the circles 604) formed therethrough that correspond to the one or more fixation points 112. Each trimmed vinyl layer is positioned onto the box 400, such that the one or more fixation points 112 fit through the holes or apertures corresponding to the circles 604. The one or more fixation points 112 are further configured to position the vinyl layers on the fabric for printing the pattern onto the fabric. For example, each weeded layer, except the backing, is placed one at a time, vinyl side up, over the pegs 120 installed on the box 400. A piece of the transfer tape 620 is installed over the pegs 120 to the top of each weeded vinyl layer. The transfer tape 620 is burnished (e.g., rubbed) down using a roller or scraper tool. The vinyl layer is removed from the pegs 120. The process is repeated for each vinyl layer except the backing. After all the vinyl layers except the backing have transfer tape installed, the backing is placed on the pegs 120 vinyl side up. The remaining vinyl layers, in ascending order, are removed from their backing and inserted over the pegs 120, and burnished to the previous layer. The transfer sheet is removed, except for the top layer which retains the transfer sheet. After burnishing the last vinyl layer of the pattern, the transfer tape remains, and the entire pattern is removed from the pegs 120. Before the pattern is applied to the target fabric, the single piece of remaining backing is removed. The design is now ready to be applied to the target fabric, burnished down, and the transfer tape 620 removed.

A user is provided with several options using the Vinyl Cutting Computer Program to isolate the color layers. A rectangle of the transfer tape 620 of a size of the pattern 708 including holes 404 (see FIG. 4) is made for each separated component except for the backing. For example, if there are four layers, three rectangles of the transfer tape 620 are cut. The pattern is sent to the vinyl cutter machine that cuts out a portion using a blade on sheets of vinyl and the transfer sheets. The pattern 708 is thus cut into the vinyl, leaving the backing uncut, except for the holes 404 that have been set to cut through the vinyl and the backing.

In some embodiments, heat transfer vinyl (HTV) is used instead of regular vinyl layers. HTV uses a clear plastic carrier sheet instead of a paper backing. The clear plastic carrier sheet covers the top of the vinyl, such that transfer tape is not needed. The process of cutting the holes for the pegs 120 and the separation of layers and colors for HTV is the same as for adhesive vinyl. The alignment holes (corresponding to the circles 604) are positioned or centered on the image 616 using the software program. The system is configured to cut through the HTV and the plastic carrier. After the HTV is cut, the pattern elements (e.g., layer 608) are weeded, leaving only the desired elements behind. The multiple HTV layers are pressed onto the fabric to transfer the pattern onto the fabric.

Applying heat transfer vinyl (HTV) or printed transfers to fabric items requires precise placement and positioning as provided by the embodiments disclosed herein. HTV can have a single layer or multiple layers that are placed one at a time and bonded to fabric 804 (see FIG. 8) by heat pressing. Typically, the first element applied (a backing) is not the center of the pattern 708 (see FIG. 7), thus requiring multiple measurements and placement marking using tradition methods. The embodiments disclosed herein provide a precise and reliable way of achieving proper alignment for the pattern 708. The methods and apparatuses disclosed herein provide a system to keep the fabric 804 taut and secured to prevent movement during the pressing process.

Figure 7:
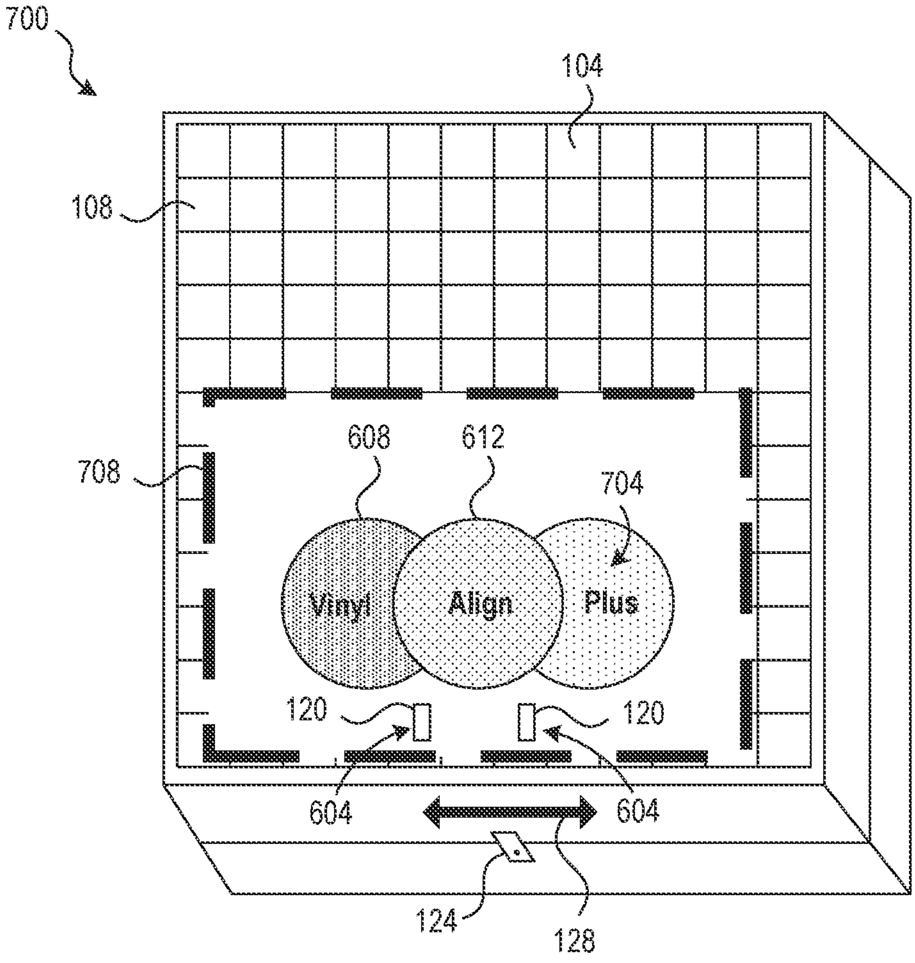
FIG. 7 is a perspective view of an apparatus for aligning, stacking, and applying craft vinyl, in accordance with one or more embodiments.

FIG. 7 is a perspective view of an apparatus for aligning, stacking, and applying craft vinyl, in accordance with one or more embodiments. The apparatus includes a rectangular, two-sided box 700. FIG. 7 shows a view of the box 700 with a cutout vinyl pattern 708 installed over pegs 120 that are inserted into slots or holes in the pattern 708. The slots or holes correspond to the circles 604 of FIG. 6. The pattern 708 can be created using cutter's software. For a pattern 708 having multiple color layers 608, 612 or shapes, each layer or element is isolated and/or replicated, along with their alignment circles 604 and separated from the pattern's image 616 as a separate standalone image (see FIG. 6).

The rectangular box 700 has a first surface 104 having a first measurement grid 108 affixed thereupon. The first surface 104 is opposite a second surface when the box 700 is in a closed configuration. Fabric is aligned to the first measurement grid 108. The pattern 708 includes multiple layers 608, 612 defining the pattern 708. In some embodiments, the layers 608, 612 are made of vinyl. Each layer 608 is aligned to each other layer 612 by one or more fixation points 112 located on an edge of the first surface 104 of the box 700. The one or more fixation points 112 can include pins, screws, tacks, or the pegs 120. The layers 608, 612 are aligned via apertures or holes formed therethrough that correspond to the one or more fixation points 112. In some embodiments, waste vinyl is trimmed off the vinyl layers 608, 612 for aligning each layer. For example, once a vinyl cutter has cut the pattern 708, waste vinyl is removed or weeded from the paper-backed sheet. This leaves only the desired shapes that remain attached to the backing.

In some embodiments, the one or more affixation points 112 are further configured to position the vinyl layers 608, 612 on the fabric for printing the pattern 708 onto the fabric. The layers 608, 612 are positioned on the fabric by the one or more fixation points 112. In some embodiments, each trimmed vinyl layer is positioned onto the box 700, such that the one or more fixation points 112 fit through the holes or apertures. Each weeded layer, except the backing, is placed one at a time, vinyl up, over the pegs 120 installed on the box 700. A piece of transfer tape is installed over the pegs 120 over each weeded vinyl layer. The transfer tape is burnished down using a roller or scraper tool. Each vinyl layer is removed from the pegs 120 one at a time and the process is repeated for each other layer except for the backing.

After all layers but the backing have transfer tape attached, the backing is installed on the pegs 120 vinyl side up. The remaining vinyl layers, in ascending order, are removed from their backing and inserted over the pegs 120 and burnished to the previous layer. The transfer sheet is removed except for the top layer. After burnishing the last layer to the pattern, the transfer tape remains, and the entire pattern is removed from the pegs 120. Before the pattern is applied to the target surface, the single piece of remaining backing is removed. The pattern is ready to be applied to the target surface, burnished down, and transfer tape removed. The layers 608, 612 are pressed onto the fabric to transfer the pattern 70 onto the fabric. In some embodiments, the layers are pressed onto the fabric using heat transfer.

The box 700 provides a smooth, flat surface beneficial for the process involved in printing the pattern 708 using adhesive vinyl as well as HTV. The cut pattern 708 is weeded (for removing unwanted elements) and the transfer tape is burnished (applied with pressure using a roller or a scraper-like tool) to each of the elements. This box 700 provides a work surface with portability. The numerous tools and accessories useful in the creation of the pattern 708 are stored in the tool and accessory storage 304 (see FIG. 3) within the box 700.

Figure 8:
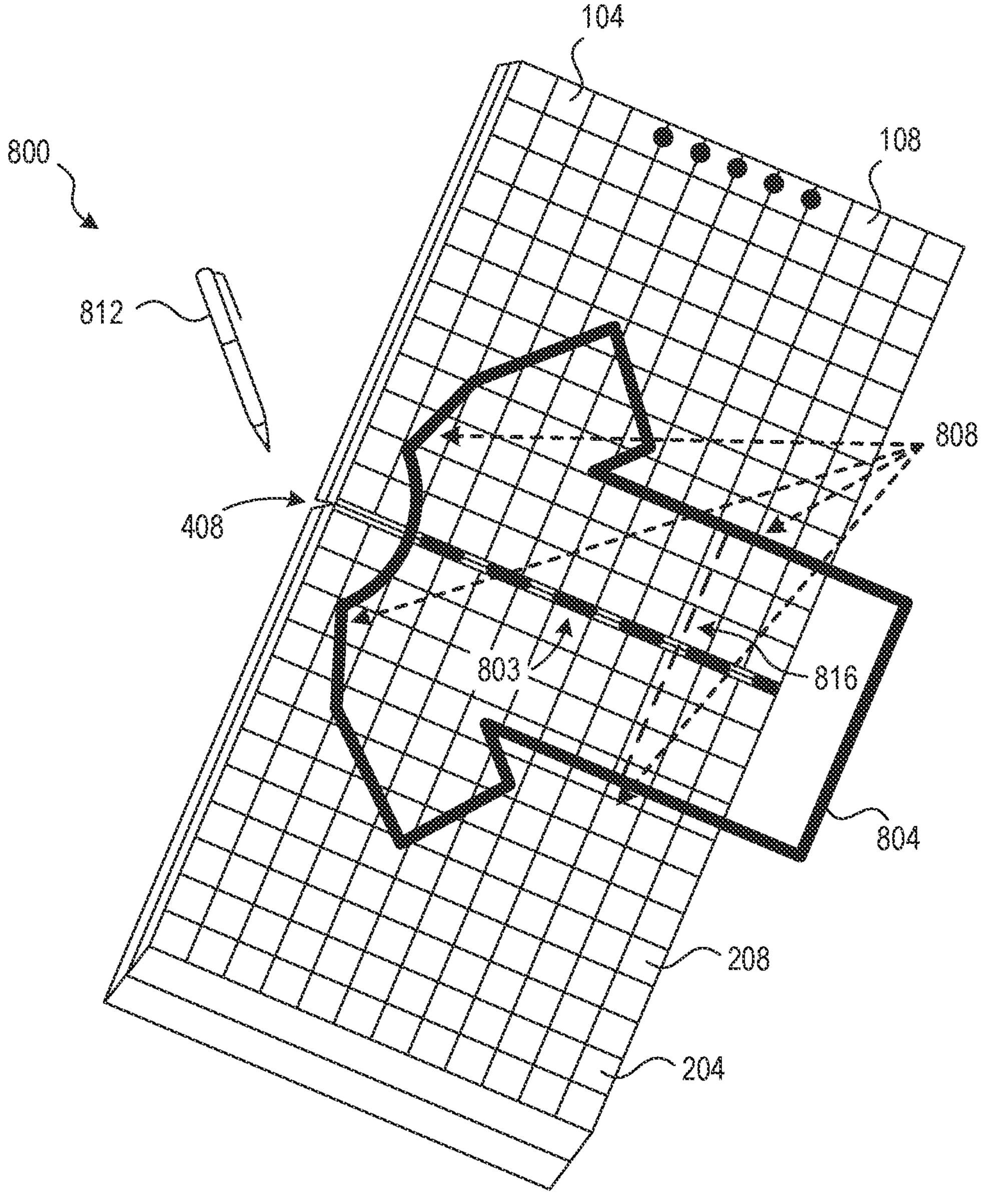
FIG. 8 is a perspective view of an apparatus for aligning, stacking, and applying craft vinyl, in accordance with one or more embodiments.

FIG. 8 is a perspective view of an apparatus for aligning, stacking, and applying craft vinyl, in accordance with one or more embodiments. The apparatus includes a rectangular, two-sided box 800 having a first surface 104 and a second surface 204. The first surface 104 has a first measurement grid 108 affixed thereupon and the second surface 204 has a second measurement grid 208 affixed thereupon. The first and second surfaces 104, 204 are aligned in a plane when the box 800 is in an open configuration. The fabric 804 is secured by fasteners to the box 800 when the box 800 is in the open configuration.

The fabric 804 is aligned to the first measurement grid 108 and the second measurement grid 208. For example, a pattern 708 (see FIG. 7) can be center placed on the front or back of a shirt. The box 800 can also be used when putting designs, lettering, or numbers on numerous other articles and in various other placement points. The box 800 is opened and placed with both side's grids 108, 208 in a plane. The target fabric 804 is centered between the two sides 104, 204 by alignment to the grid marks on both grids 108, 208. Using the opening or space 408 between the surfaces 104, 204, a heat erasable pen 812 is used to run a vertical line down the space. A desired location for the bottom of the pattern 708 placement is determined that includes an allowance for space between the holes 404 and the pattern 708. A horizontal position 816 is marked by the heat erasable pen 812.

Figure 9:
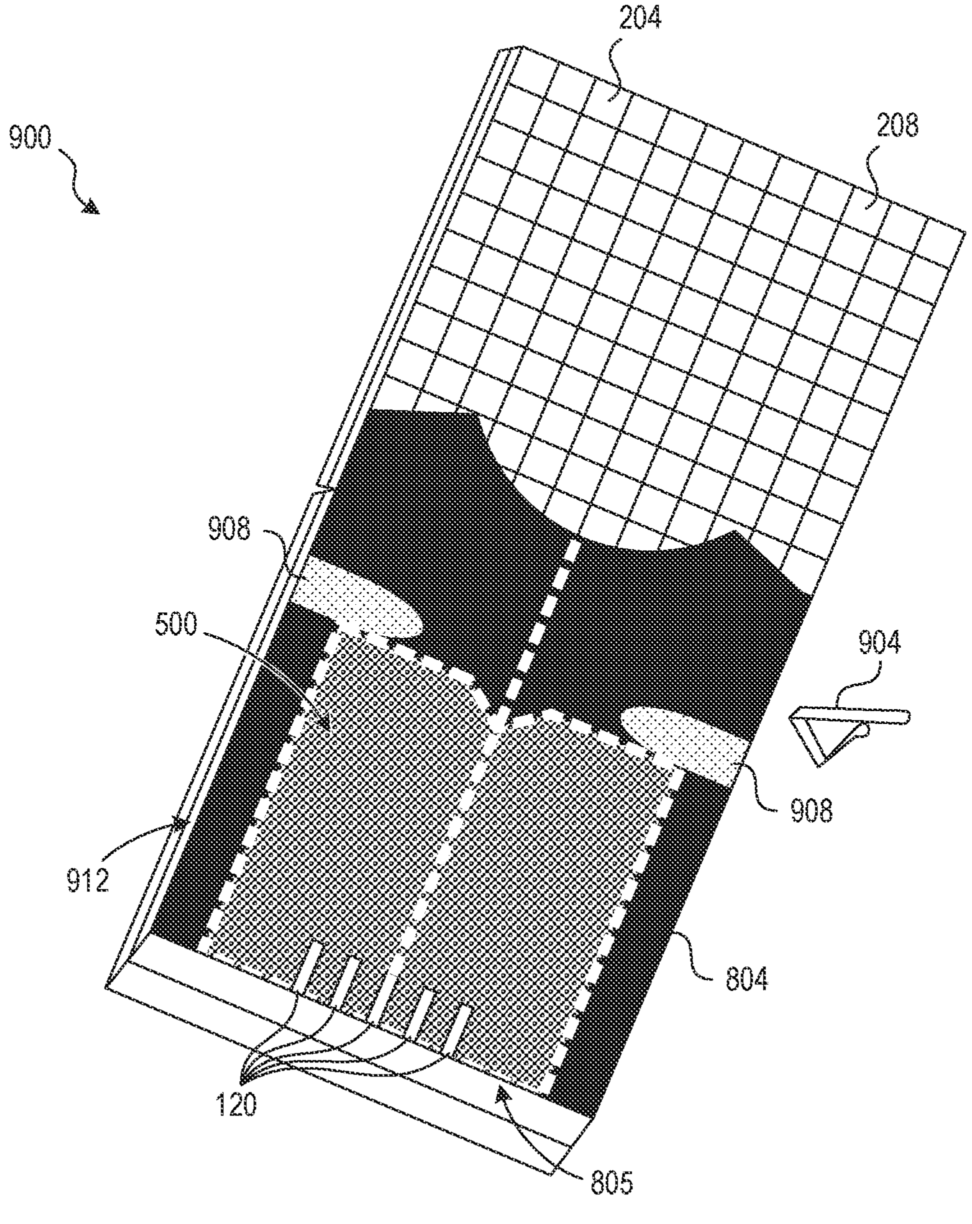
FIG. 9 is a perspective view of an apparatus for aligning, stacking, and applying craft vinyl, in accordance with one or more embodiments.

FIG. 9 is a perspective view of an apparatus 900 for aligning, stacking, and applying craft vinyl, in accordance with one or more embodiments. The apparatus includes a box 900 having a first surface having a first measurement grid affixed thereupon. The box 900 has a second surface 204 having a second measurement grid 208 affixed thereupon. One or more fixation points 112 are located on an edge of the first surface of the box 900. The fixation points 120 can include either a pin, screw, tack, or peg 120. The fixation points 112 align each layer defining a pattern 708 (see FIG. 7) to each other layer when the box 900 is in an open configuration. The layers can be made of vinyl. The fixation points 112 align the layers on a fabric 804 secured to the box 900. In some embodiments, the layers are aligned via apertures formed therethrough that correspond to the one or more fixation points 112. For example, each trimmed vinyl layer is positioned onto the box 900, such that the one or more fixation points 112 fit through the apertures.

The one or more fixation points 112 are further configured to position the vinyl layers on the fabric 804 for printing the pattern 708 onto the fabric 804. The apparatus further includes multiple fasteners 904 attached to one or more sides of the box 900. The fasteners 904 are configured to secure the fabric 804 to the first surface and the second surface 204 when the box 900 is in the open configuration. In some embodiments, securing the fabric 804 includes folding the fabric 804 around the box 900 and positioning the fasteners 904 on one or more sides of the box 900, for example, at the positions 908. In some embodiments, the fasteners 904 are clamps or pins. The target fabric 804 is folded under the box 900, for example, around the side 912, making the fabric 804 taut. The fasteners 904 are placed around the box 900 to secure and prevent movement of the fabric 804. The fasteners 904 are further configured to align the fabric 804 to the first measurement grid 108 and the second measurement grid 208.

In some embodiments, the fabric 804 is folded under the box 900 on the side 912, making the fabric 804 taut. The fasteners 904 are placed around the box 900 to secure and prevent movement. The backing is placed over the pegs 120 and heat pressed to the fabric 804. The plastic carrier is removed and the following layers, in ascending order, are placed over the pegs 120 and pressed over the previous layer. The multiple layers are pressed onto the fabric 804 to transfer the pattern 708 onto the fabric 804. For example, the backing is placed over the fixation points 112 and heat pressed to the fabric 804. The plastic carrier is removed and the following layers, in ascending order, are placed over the fixation points 112 and pressed over the previous layer and the plastic carrier is removed. The pattern 708 is now printed on the fabric 804 with proper placement. The lines made using the heat erase pen 812 are gone. The pattern 708 is now on the fabric 804 with proper placement.

It will be apparent to one with skill in the art of vinyl crafting that this vinyl invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many 40 alterations made in the descriptions without departing from the spirit and scope of the present invention.

FIG. 2 is a perspective view of the box top and back with a set of hinges. FIG. 3 is a perspective view of the inside of the box which houses an attached/secured removable utility bag on one side, and a set of tool holders on the other side. FIG. 4 is a perspective view of the box placed in an inside down position. FIG. 5, in this example is a view of the garment align and pressboard featuring a grid, half-circle anchor/alignment slots. FIG. 6 is a perspective view of vinyl layout on a computer screen. FIG. 8 is a perspective view of a shirt centered on the narrow space between the two sides and marked using a heat disappearing pen. FIG. 9 shows the placement of a shirt on the apparatus with alignment board inserted behind shirt aligned with half circles to the pegs 120 at the bottom and V shape on centerline, tucked under, and secured with clamps.

Figure 10:
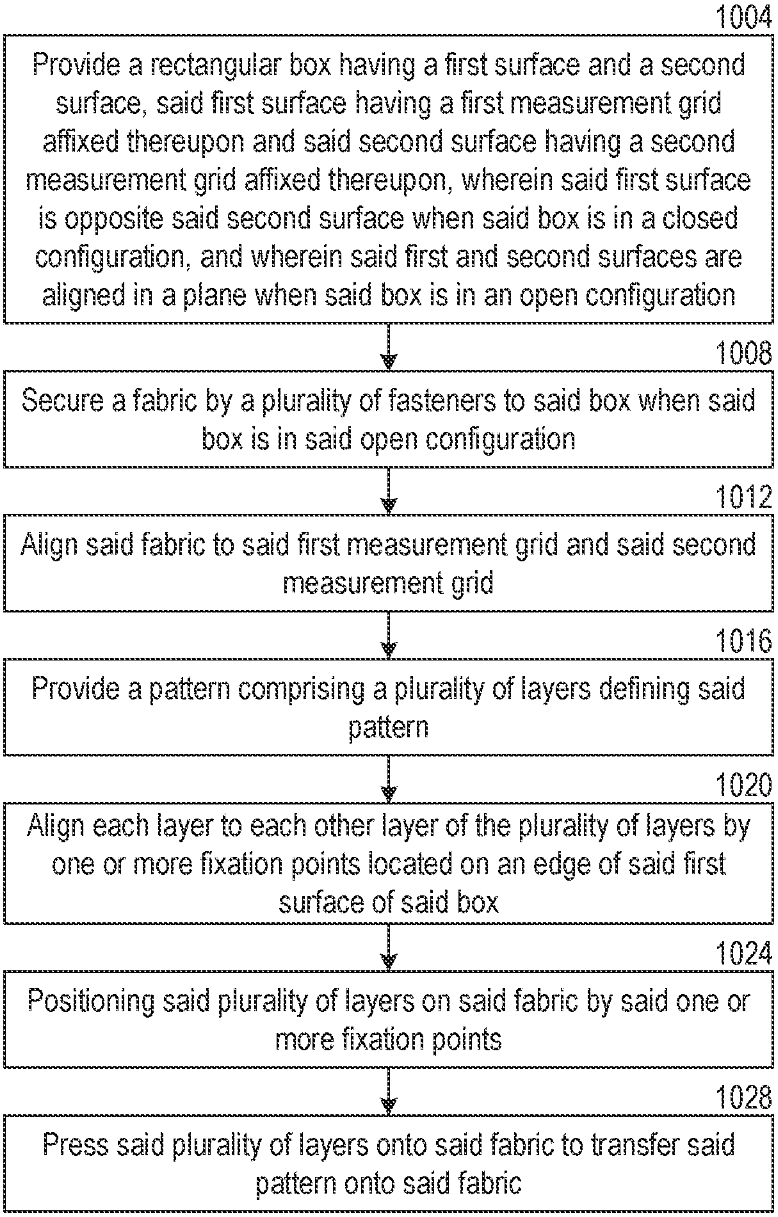
FIG. 10 is a flow diagram illustrating a process for aligning, stacking, and applying craft vinyl, in accordance with one or more embodiments.

FIG. 10 is a flow diagram illustrating a process for aligning, stacking, and applying craft vinyl, in accordance with one or more embodiments. In some embodiments, the process of FIG. 10 is performed by a mechanical manufacturing system or a robot. In other embodiments, the process of FIG. 10 is performed by a computer system. Likewise, embodiments can include different and/or additional steps, or perform the steps in different orders.

In step 1004, a rectangular box 100 is provided (see FIG. 1). The rectangular box 100 has a first surface 104 and a second surface. An example second surface 204 is shown by FIG. 2. The first surface 104 has a first measurement grid 108 affixed thereupon. The second surface 204 has a second measurement grid 208 affixed thereupon (see FIG. 2). The first surface 104 is opposite the second surface 204 when the box 100 is in a closed configuration, as shown by FIG. 1. The first 104 and second surfaces 204 are aligned in a plane when the box 100 is in an open configuration, as shown by FIG. 4.

In step 1008, a fabric 804 (see FIG. 8) is secured by multiple fasteners 904 (see FIG. 9) to the box 100 when the box 100 is in the open configuration. For example, the fasteners 904 are placed in the locations 908 on the box. The fasteners 904 are configured to secure the fabric 804 to the first surface 104 and the second surface 204 when the box 100 is in the open configuration. In some embodiments, securing the fabric 804 includes folding the fabric 804 around the box 100 and positioning the fasteners 904 on one or more sides of the box 100, for example, at the positions 908 (see FIG. 9).

In step 1012, the fabric 804 is aligned to the first measurement grid 108 and the second measurement grid 208. For example, the multiple layers of vinyl are positioned on the fabric 804 by the one or more fixation points 112 for pressing the layers onto the fabric 804 to transfer the pattern 708 onto the fabric 804. The multiple layers are aligned via multiple apertures 404 formed therethrough that correspond to the one or more fixation points 112. Each vinyl layer is positioned onto the box 100, such that the one or more fixation points 112 fit through the apertures 404 (see FIG. 4).

In step 1016, a pattern 708 is provided that includes multiple layers 608, 612 defining the pattern (see FIGS. 6, 7). In some embodiments, the multiple layers 608, 612 are made of vinyl. Alignment circles 604 are positioned or centered to the middle of an image 616 of the pattern. For a pattern having multiple color layers and shapes 608, 612, the elements of the pattern are isolated and/or replicated along with their alignment circles 604. Each element (e.g., layer 612) is isolated using the software on the computer 600 and separated from the image 616 as a separate standalone image.

In step 1020, each layer (e.g., layer 608) is aligned to each other layer (e.g., layer 612) of the multiple layers 608, 612 by one or more fixation points 112 (see FIG. 1) located on an edge 116 of the first surface 104 of the box 100. Each layer (e.g., layer 608) will be aligned to each other layer (e.g., layer 612) by the one or more fixation points 112 corresponding to the holes (corresponding to the circles 604).

In step 1024, the multiple layers 608, 612 are positioned on the fabric 804 by the one or more fixation points 112. The layers are positioned on the fabric by the one or more fixation points 112 (see FIG. 1). A rectangle of transfer tape 620 is cut for each separated component (e.g., layer 608), except for a back layer (sometimes referred to as a backing). The pattern is cut in the vinyl layers, leaving the backing uncut, except for the holes (corresponding to the circles 604) that have been cut through the vinyl and the backing. In some embodiments, waste vinyl is trimmed off the vinyl layers for aligning each layer. For example, once the vinyl cutter has been used to cut the pattern, all waste vinyl is removed (sometimes referred to as weeded) from the paper-backed sheet. This leaves only the desired shapes (e.g., layer 612) that remain attached to the backing. The weeding can be performed on the top of the box 400. In some embodiments, the "positive parts" of the design (e.g., layer 612) are themselves removed, such that a "negative" decal would result from printing on fabric. Such a decal can be used as a stencil. In other embodiments, the "negative parts" are removed, providing a positive decal.

In step 1028, the multiple layers 608, 612 are pressed onto the fabric 804 to transfer the pattern 604 onto the fabric 804 (see FIG. 8). In some embodiments, heat transfer vinyl (HTV) is used instead of regular vinyl layers. HTV uses a clear plastic carrier sheet instead of a paper backing. The clear plastic carrier sheet covers the top of the vinyl, such that transfer tape is not needed. The process of cutting the holes for the fixation points 112 (se FIG. 1) and the separation of layers and colors for HTV is the same as for adhesive vinyl. The alignment holes (corresponding to the circles 604) are positioned or centered on the image 616 using the software program. The system is configured to cut through the HTV and the plastic carrier. After the HTV is cut, the pattern elements (e.g., layer 608) are weeded, leaving only the desired elements behind. The multiple HTV layers are pressed onto the fabric to transfer the pattern onto the fabric.

Figure 11:
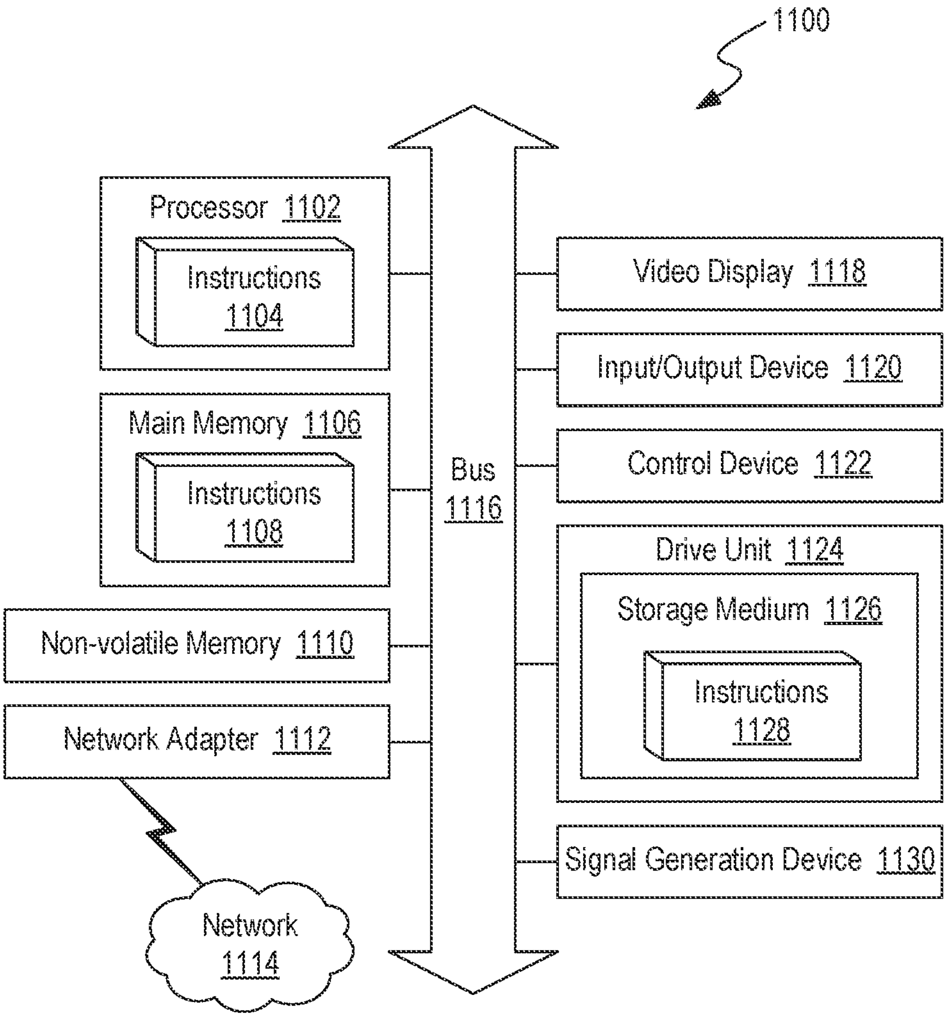
FIG. 11 is a block diagram illustrating an example computer system, in accordance with one or more embodiments.

FIG. 11 is a block diagram illustrating an example computer system 1100, in accordance with one or more embodiments. Components of the example computer system 1100 can be used to implement the computer 600 illustrated and described in more detail with reference to FIG. 6. At least some operations described herein can be implemented on the computer system 1100.

The computer system 1100 can include one or more central processing units ("processors") 1102, main memory 1106, non-volatile memory 1110, network adapters 1112 (e.g., network interface), video displays 1118, input/output devices 1120, control devices 1122 (e.g., keyboard and pointing devices), drive units 1124 including a storage medium 1126, and a signal generation device 1120 that are communicatively connected to a bus 1116. The bus 1116 is illustrated as an abstraction that represents one or more physical buses and/or point-to-point connections that are connected by appropriate bridges, adapters, or controllers. The bus 1116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1100 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1100.

While the main memory 1106, non-volatile memory 1110, and storage medium 1126 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1128. The term "machine-readable medium" and "storage medium" shall also be taken to include any medium that is capable of storing, encoding, or carrying a set of instructions for execution by the computer system 1100.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1104, 1108, 1128) set at various times in various memory and storage devices in a computer device. When read and executed by the one or more processors 1102, the instruction(s) cause the computer system 1100 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1110, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1112 enables the computer system 1100 to mediate data in a network 1114 with an entity that is external to the computer system 1100 through any communication protocol supported by the computer system 1100 and the external entity. The network adapter 1112 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1112 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

It will be apparent to one with skill in the art of vinyl crafting that the vinyl apparatus and system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many 40 alterations made in the descriptions without departing from the spirit and scope of the present invention.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be the in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Although the invention has been explained in relation to its preferred embodiment, it is to be understood that many other possible modifications and variations can be made without departing from the spirit and scope of the invention.

I claim:

1. A method comprising:

providing a rectangular box having a first surface and a second surface, said first surface having a first measurement grid affixed thereupon and said second surface having a second measurement grid affixed thereupon, wherein said first surface is opposite said second surface when said box is in a closed configuration, and wherein said first and second surfaces are aligned in a plane when said box is in an open configuration;

securing a fabric by a plurality of fasteners to said box when said box is in said open configuration;

aligning said fabric to said first measurement grid and said second measurement grid;

providing a pattern comprising a plurality of layers defining said pattern;

aligning each layer to each other layer of said plurality of layers by one or more fixation points located on an edge of said first surface of said box;

positioning said plurality of layers on said fabric by said one or more fixation points; and pressing said plurality of layers onto said fabric to transfer said pattern onto said fabric.

2. The method of claim 1, wherein said plurality of layers is pressed onto said fabric using heat transfer.

3. The method of claim 1, wherein securing said fabric comprises:

folding said fabric around said box; and positioning said plurality of fasteners on one or more sides of said box.

4. The method of claim 1, further comprising:

aligning said plurality of layers via a plurality of apertures formed therethrough that correspond to said one or more fixation points.

5. The method of claim 4, wherein said plurality of layers are made of vinyl.

6. The method of claim 5, further comprising trimming waste vinyl off said plurality of vinyl layers for aligning said each layer.

7. The method of claim 6, further comprising positioning each trimmed vinyl layer onto said box, such that said one or more fixation points fit through said apertures.

8. The method of claim 1, further comprising centering said pattern on said fabric using a fabric alignment board.

9. The method of claim 8, further comprising:

centering said pattern by said fabric alignment board by marking said pattern with a centered line using a heat erasable pen.

10. The method of claim 1, wherein said fixation points comprise at least one of pins, screws, tacks, or pegs.

11. An apparatus comprising:

a box comprising:

a first surface having a first measurement grid affixed thereupon; and a second surface having a second measurement grid affixed thereupon, said first surface positioned opposite said second surface when said box is in a closed configuration; and one or more affixation points located on an edge of said first surface of said box and configured to:

align each layer of a plurality of layers defining a pattern to each other layer of said plurality of layers by one or more affixation points located on an edge of said first surface of said box when said box is in an open configuration; and align said plurality of layers on a fabric secured to said box.

12. The apparatus of claim 11, wherein said one or more affixation points are further configured to position said plurality of vinyl layers on said fabric for printing said pattern onto said fabric.

13. The apparatus of claim 11, further comprising a plurality of fasteners attached to one or more sides of said box and configured to secure said fabric to said first surface and said second surface when said box is in said open configuration.

14. The apparatus of claim 13, wherein said plurality of clamps is further configured to align said fabric to said first measurement grid and said second measurement grid.

15. The apparatus of claim 11, further comprising a tool configured to form alignment apertures through said one or more layers.

16. The apparatus of claim 11, further comprising a fabric alignment board attached to said box and configured to center said pattern on said fabric.

17. The apparatus of claim 11, wherein said fabric alignment board is configured to center said pattern by aligning a center vertical line and a center horizontal line marked on said pattern with notches on sides of said fabric alignment board.

18. The apparatus of claim 11, further comprising a removable utility bag mounted on an inner surface of said box.

19. The apparatus of claim 11, further comprising a set of tool holders mounted on an inner surface of said box.

20. The apparatus of claim 11, wherein said fixation points comprise of either a pin, screw, tack, or peg.

* * * * *